United States Patent

Agata et al.

(10) Patent No.: US 6,681,061 B2
(45) Date of Patent: Jan. 20, 2004

(54) METHOD AND APPARATUS FOR IMAGE RETRIEVAL

(75) Inventors: Hideyuki Agata, Tokyo (JP); Yoshiyuki Fujiwara, Kanagawa (JP); Hiroyuki Bando, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/033,630

(22) Filed: Dec. 28, 2001

(65) Prior Publication Data

US 2002/0063895 A1 May 30, 2002

Related U.S. Application Data

(63) Continuation of application No. 09/276,050, filed on Mar. 25, 1999.

(30) Foreign Application Priority Data

Mar. 26, 1998 (JP) ............................................ 10-079504

(51) Int. Cl.[7] ............................. G06K 9/54; H04N 1/00; G03B 17/24
(52) U.S. Cl. ..................... 382/305; 358/403; 396/310
(58) Field of Search ....................... 382/305; 348/231.2, 348/286; 396/310, 332; 707/104.1; 358/1.15, 1.18, 403

(56) References Cited

U.S. PATENT DOCUMENTS

| 5,553,277 A | * | 9/1996 | Hirano et al. | ............ 707/104.1 |
| 5,576,759 A | | 11/1996 | Kawamura | .................. 348/231 |
| 5,829,044 A | * | 10/1998 | Sono | .......................... 711/156 |
| 5,917,488 A | | 6/1999 | Anderson et al. | ........... 345/342 |
| 5,937,107 A | | 8/1999 | Kazami et al. | ............. 382/298 |
| 5,966,122 A | | 10/1999 | Itoh | .......................... 345/328 |
| 5,982,955 A | * | 11/1999 | Yaguchi et al. | ............. 382/305 |
| 6,061,055 A | | 5/2000 | Marks | ........................ 345/327 |
| 6,065,015 A | | 5/2000 | Kazami | ...................... 707/104 |
| 6,137,914 A | | 10/2000 | Ligtenberg et al. | ......... 382/240 |
| 6,154,755 A | | 11/2000 | Dellert et al. | ............... 707/526 |
| 6,230,187 B1 | * | 5/2001 | Suzuki | ....................... 709/206 |

* cited by examiner

Primary Examiner—Bhavesh M. Mehta
Assistant Examiner—Kanji Patel
(74) Attorney, Agent, or Firm—Frommer Lawrence & Haug LLP; William S. Frommer

(57) ABSTRACT

An image retrieval method and an image retrieval apparatus are disclosed in which it is possible to identify in which image-information recording medium or in which group an image to be retrieved is included. The image retrieval apparatus has a recording controller for recording image information on a disk drive or a hard disk drive. A reduction/expansion controller generates an index picture of a predetermined group of the image information. A retrieval-information storage unit generates index picture IDs, medium IDs, and folder IDs while correlating the above different types of IDs with each other, and stores the IDs together with the index pictures. With this arrangement, a desired item of image information is retrieved by using the index pictures, the index picture IDs, the medium IDs, and the folder IDs. It is thus possible to obtain a target image by sequentially checking the index picture visually.

3 Claims, 4 Drawing Sheets

METHOD AND APPARATUS FOR IMAGE RETRIEVAL

This is a continuation of U.S. Ser. No. 09/276,050, filed Mar. 25, 1999.

BACKGROUND OF THE INVENTION

1. Field of the Invention

The present invention relates to an image retrieval method and to an image retrieval apparatus, which are suitably used for retrieving image information recorded by, for example, digital cameras or digital video cameras.

2. Description of the Related Art

With the recent widespread use of digital cameras and digital video cameras, digitized images can be easily obtained. It also becomes possible to store a few hundred of such images as image data in a recording medium. Generally, the image data is not stored in only a specific area of a single storage unit, but is stored as image data files in a plurality of recording media or in a plurality of folders in a large-capacity storage unit.

As one of the conventional image retrieval methods for retrieving a desired image from image data stored by being distributed in a plurality of storage units, the following method is known. Images of icons, each having a size of a thumb-nail, which are referred to as "thumb-nail images", have been created for each medium or in each folder. By visually checking the thumb-nail images in each medium or in each folder, a desired image can be retrieved.

Japanese Unexamined Patent Publication No. 2-196375 discloses the following type of image retrieval apparatus. A list of reduced images has been created by extracting characteristic portions of the individual images, and such a list is displayed. Keywords related to the images are provided. With this arrangement, an image matching the retrieval conditions can be acquired.

The following electronic file method and apparatus are disclosed in Japanese Unexamined Patent Publication No. 9-114845. The frames and names of all the folders are initially displayed, and then, reduced images representing the individual folders are displayed. While the reduced images are being displayed, the index is indicated. When a particular page (document) is selected from this index, the display of the reduced images is interrupted, and the selected page (document) is displayed.

According to the aforementioned conventional image retrieval methods and apparatuses, however, it is necessary to visually check the individual thumb-nail images corresponding to a plurality of media or folders. This requires the exchange of recording media, which is troublesome and time-consuming. Accordingly, there is a demand that images stored in each medium be retrievable without the need for the exchange of media. However, the above-described image retrieval apparatus, and the electronic file method and apparatus cannot satisfy the above demand.

SUMMARY OF THE INVENTION

Accordingly, in view of the above background, it is an object of the present invention to provide an image retrieval method and an image retrieval apparatus in which it is possible to identify in which image-information recording medium or in which image-information group an image to be retrieved is included.

In order to achieve the above object, according to one aspect of the present invention, there is provided an image management apparatus including image-information recording means for recording a plurality of items of image information on an image-information recording medium. Reduced-image generating means generates a reduced image of a predetermined group of the image information recorded on each predetermined unit of the image-information recording medium. The generated reduced image is stored in the image-information recording medium.

According to another aspect of the present invention, there is provided an image management method including the steps of: recording a plurality of items of image information on an image-information recording medium; and generating a reduced image of a predetermined group of the image information recorded on each predetermined unit of the image-information recording medium. The generated reduced image is stored in the image-information recording medium.

According to still another aspect of the present invention, there is provided a storage medium for storing a program implementing the aforementioned image management method.

According to a further aspect of the present invention, there is provided an image retrieval apparatus including image-information recording means for recording a plurality of items of image information on an image-information recording medium. Reduced-image generating means generates a reduced image of a predetermined group of the image information recorded on each predetermined unit of the image-information recording medium. The generated reduced image is stored in the image-information recording medium. Image-group ID-code generating means generates an ID code of the reduced image, an ID code of the predetermined unit of the image-information recording medium, and an ID code of the predetermined group while correlating the ID code of the reduced image with the ID code of the predetermined unit of the image-information recording medium and the ID code of the predetermined group. Retrieval-information storage means stores, together with the reduced image, the ID code of the reduced image, the ID code of the predetermined unit of the image-information recording medium, and the ID code of the predetermined group. A desired item of image information is retrieved by using the ID code of the reduced image, the ID code of the predetermined unit of the image-information recording medium, and the ID code of the predetermined group.

With this configuration, the reduced image can be correlated with the ID code of the predetermined unit of the image-information recording medium and the ID code of the predetermined group. It is thus possible to visually check, by referring to the reduced image, in which unit of the image-information recording medium or in which predetermined group a target image is included. Then, the unit of the image-information recording medium can be specified to retrieve the target image. Additionally, since the ID code of the predetermined unit of the image-information recording medium and that of the predetermined group can be obtained, the ID code of the corresponding reduced image can be easily specified, thereby retrieving the reduced image. As a consequence, with a simple configuration, a target image can be retrieved by sequentially checking the reduced image visually.

In the aforementioned image retrieval apparatus, the ID code of the reduced image, the ID code of the predetermined unit of the image-information recording medium, and the ID code of the predetermined group may be recorded on the predetermined unit of the image-information recording medium.

With this arrangement, the target reduced image can be obtained from the ID code of the reduced image and from the ID code of the predetermined unit of the recording medium and that of the predetermined groups, all of the ID codes being recorded on the predetermined unit of the image-information recording media. Accordingly, a target image can be retrieved by visually checking the reduced image of the specified image-information recording medium or the predetermined group.

In the aforementioned image retrieval apparatus, the ID code of the reduced image, the ID code of the predetermined unit of the image-information recording medium, and the ID code of the predetermined group may be printed on a label, and the label may be attached to the predetermined unit of the image-information recording medium.

With this arrangement, without erroneously selecting the unit of the recording medium, the corresponding reduced image can be reliably obtained from the ID code of the reduced image, and the ID code of the predetermined unit of the image-information recording medium and that of the predetermined group, all of the ID codes being indicated on the predetermined unit of the recording medium. It is thus possible to retrieve a target image by visually checking the reduced image of the specified unit of the image-information recording medium and the predetermined group.

According to a further aspect of the present invention, there is provided an image retrieval method including the steps of: recording a plurality of items of image information on an image-information recording medium; generating a reduced image of a predetermined group of the image information recorded on each predetermined unit of the image-information recording medium, the generated reduced image being stored in the image-information recording medium; generating an ID code of the reduced image, an ID code of the predetermined unit of the image-information recording medium, and an ID code of the predetermined group while correlating the ID code of the reduced image with the ID code of the predetermined unit of the image-information recording medium and the ID code of the predetermined group; and storing the ID code of the reduced image, the ID code of the predetermined unit of the image-information recording medium, and the ID code of the predetermined group together with the reduced image. A desired item of image information is retrieved by using the ID code of the reduced image, the ID code of the predetermined unit of the image-information recording medium, and the ID code of the predetermined group.

With this arrangement, the reduced image can be correlated with the ID code of the predetermined unit of the image-information recording medium and that of the predetermined group. It is thus possible to visually check, by referring to the reduced image, in which unit of the image-information recording medium or in which predetermined group a target image is included. Then, the unit of the image-information recording medium can be specified, and a target image can be retrieved merely by searching the specified unit of the recording medium. Additionally, the ID code of the predetermined unit of the image-information recording medium and that of the predetermined group can be obtained, and thus, the corresponding ID code of the reduced image can be acquired, thereby retrieving the corresponding reduced image. As a result, a target image can be retrieved by sequentially checking the reduced image visually, thereby decreasing the retrieval processing time.

In the aforementioned image retrieval method, the storing step may store a retrieval word in correspondence with the reduced image, the predetermined unit of the image-information recording medium, and the predetermined group, and the ID code of the reduced image, the ID code of the predetermined unit of the image-information recording medium, and the ID code of the predetermined group may be output in correspondence with the retrieval word.

With this arrangement, the ID code of the reduced image and the ID code of the predetermined unit of the image-information recording medium and that of the predetermined group are output in correspondence with the input retrieval word. Accordingly, the predetermined unit of the image-information recording medium and the predetermined group can be easily specified, and also, the ID code of the corresponding reduced image can be obtained. It is thus possible to retrieve a target image by sequentially checking the corresponding reduced image visually.

In the aforementioned image retrieval method, the reduced image may be stored by selecting a desired item of image information. Accordingly, characteristic reduced image can be selected. By referring to the characteristic reduced image, the corresponding unit of image-information recording medium and the predetermined group can be specified. This eliminates the unnecessary retrieval operation and enhances efficient retrieval of a target image in a short time.

According to a further aspect of the present invention, there is provided a storage medium for storing a program implementing the aforementioned image retrieval method.

According to a further aspect of the present invention, there is provided an image printing apparatus including image-information recording means for recording a plurality of items of image information on an image-information recording medium. Reduced-image generating means generates a reduced image of a predetermined group of the image information recorded on each predetermined unit of the image-information recording medium. The generated reduced image is stored in the image-information recording medium. Image-group ID-code generating means generates an ID code of the reduced image, an ID code of the predetermined unit of the image-information recording medium, and an ID code of the predetermined group while correlating the ID code of the reduced image with the ID code of the predetermined unit of the image-information recording medium and the ID code of the predetermined group. Retrieval-information storage means stores the ID code of the reduced image, the ID code of the predetermined unit of the image-information recording medium, and the ID code of the predetermined group together with the reduced image. Printing means prints the ID code of the reduced image, the ID code of the predetermined unit of the image-information recording medium, and the ID code of the predetermined group on a label, the label being attached to the predetermined unit of the image-information recording medium. A desired item of image information is retrieved by using the ID code of the reduced image, the ID code of the predetermined unit of the image-information recording medium, and the ID code of the predetermined group.

DESCRIPTION OF THE PREFERRED EMBODIMENT

Figure 1:
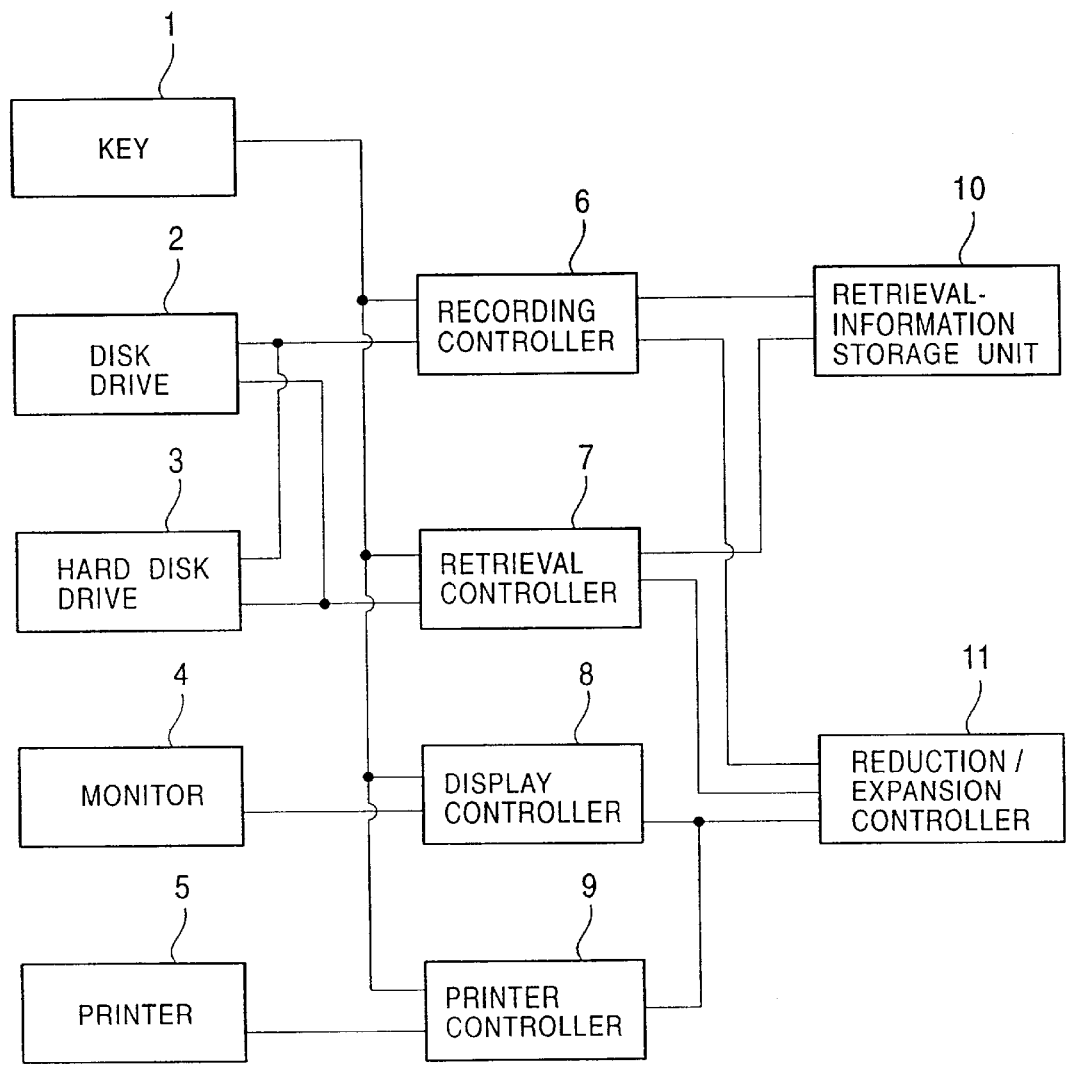
FIG. 1 is a block diagram illustrating the configuration of an image retrieval apparatus according to an embodiment of the present invention.

An embodiment of the present invention is described in detail below with reference to the drawings.

According to this embodiment, a single ID picture including all the reduced images of the individual original images in an image group is created. The respective ID pictures are related to the image groups. It is thus possible to visually determine to which group an image to be retrieved belongs.

The configuration of an image retrieval apparatus constructed in accordance with this embodiment of the present invention is first discussed below with reference to FIG. 1. The image retrieval apparatus has the following elements. A key 1 is used for inputting retrieval information and various recording conditions or retrieval conditions. A disk drive 2 is used for recording or reproducing image information on or from a plurality of disks. A hard disk drive 3 is used for recording or reproducing image information on or from a plurality of hard disks. A monitor 4 displays retrieval information or image information. A printer 5 prints retrieval information or image information. A recording controller 6 controls the recording operation performed on the disk drive 2 or the hard disk drive 3. A retrieval controller 7 controls the retrieval operation performed on the disk drive 2 or the hard disk drive 3. A display controller 8 controls the display of the monitor 4. A printer controller 9 controls the printing operation of the printer 5. A retrieval-information storage unit 10 stores retrieval information. A reduction/expansion controller 11 generates an index picture by reducing image information and expands an image to be retrieved included in the index picture.

According to this embodiment, the reduction/expansion controller 11 creates reduced images of a predetermined group of the image information recorded on each image-information recording medium. The recording controller 6 generates an ID code of the reduced images and an ID code of an image-information recording medium and that of a folder (a predetermined group) while correlating the respective ID codes with each other. The retrieval-information storage unit 10 stores as retrieval information the ID code of the reduced images and the ID code of the image information recording medium and that of the folder (predetermined group). The retrieval controller 7 retrieves a desired item of image information by using the ID code of the reduced images and the ID code of the image-information recording medium and that of the folder (predetermined group).

The recording controller 6 stores in the image-information recording medium the ID code of the reduced images and the ID code of the image-information recording medium and that of the folder (predetermined group). The printer controller 9 controls the printer 5 to print on labels the ID code of the reduced images and the ID codes of the image-information recording medium and the folder (predetermined group), and the labels are attached to the respective image-information recording media.

The operation of the image retrieval apparatus constructed as described above is as follows.

Figure 4:
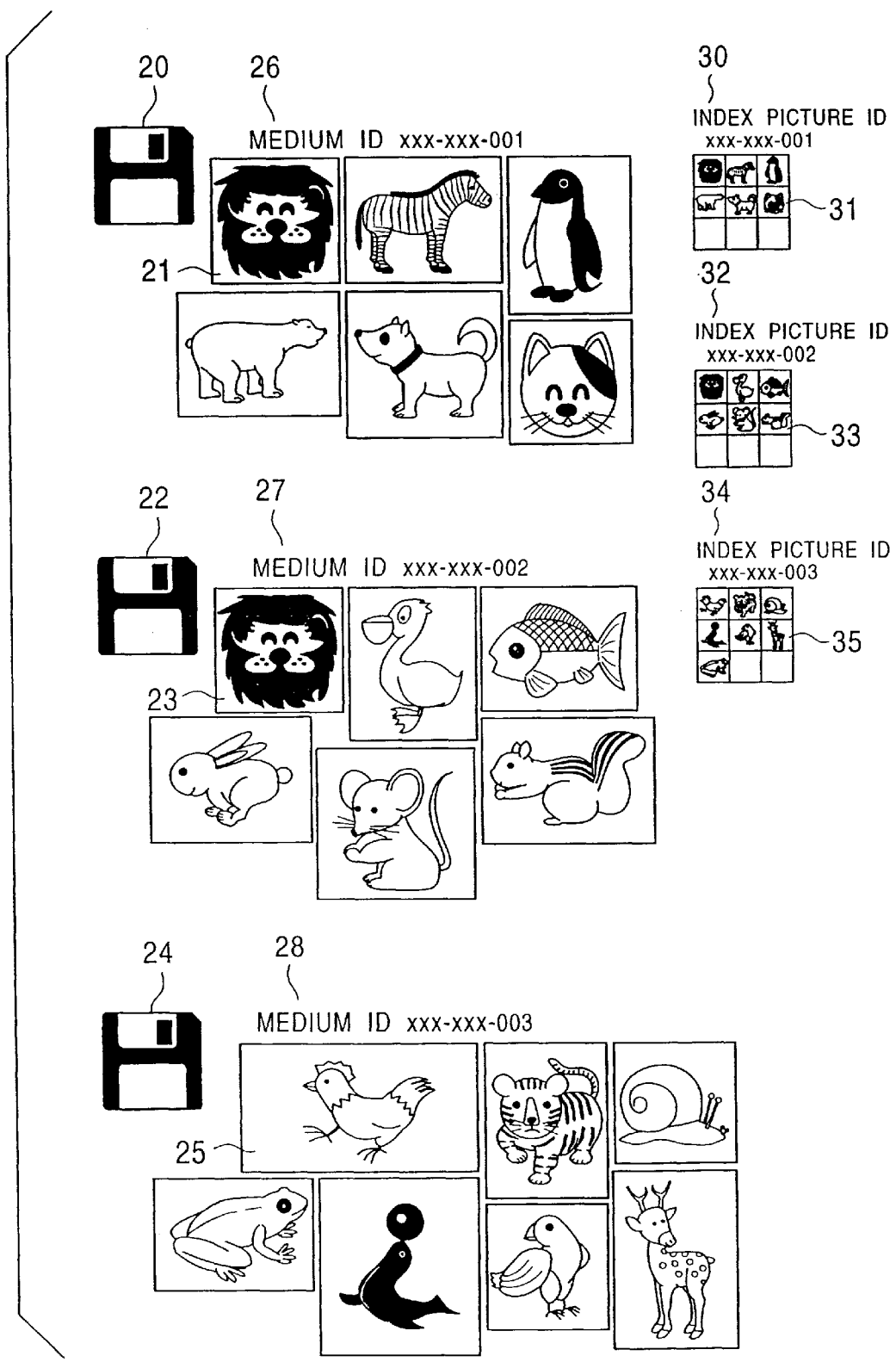
FIG. 4 illustrates medium IDs and index picture IDs according to an embodiment of the present invention.

The recording operation is first discussed below with reference to the flow chart of FIG. 2. In FIG. 2, in step S1, an index picture is created, and more specifically, the recording controller 6 shown in FIG. 1 controls the reduction/expansion controller 11 to create an index picture by reducing original images. That is, as shown in FIG. 4, all the images 21 to be recorded on a medium 20 or a desired image selected from the images 21 are reduced to create a 384×256(=(128×3)×(128×2))–dot index picture 31. All the images 23 to be recorded on a medium 22 or a desired image selected from the images 23 are reduced to create a 384×256(=(128×3)×(128×2))–dot index picture 33. All the images 25 to be recorded on a medium 24 or a desired image selected from the images 24 are reduced to create a 384×384(=(128×3)×(128×3))–dot index picture 35. The size of each image of the index picture is 128×128 dots. The image data used in this index is digital data supplied from a camera (not shown) or from an external computer via an interface (not shown). The display controller 8 controls the monitor 4 to display the images 21, 23, and 25, and the index pictures 31, 33, and 35.

Figure 2:
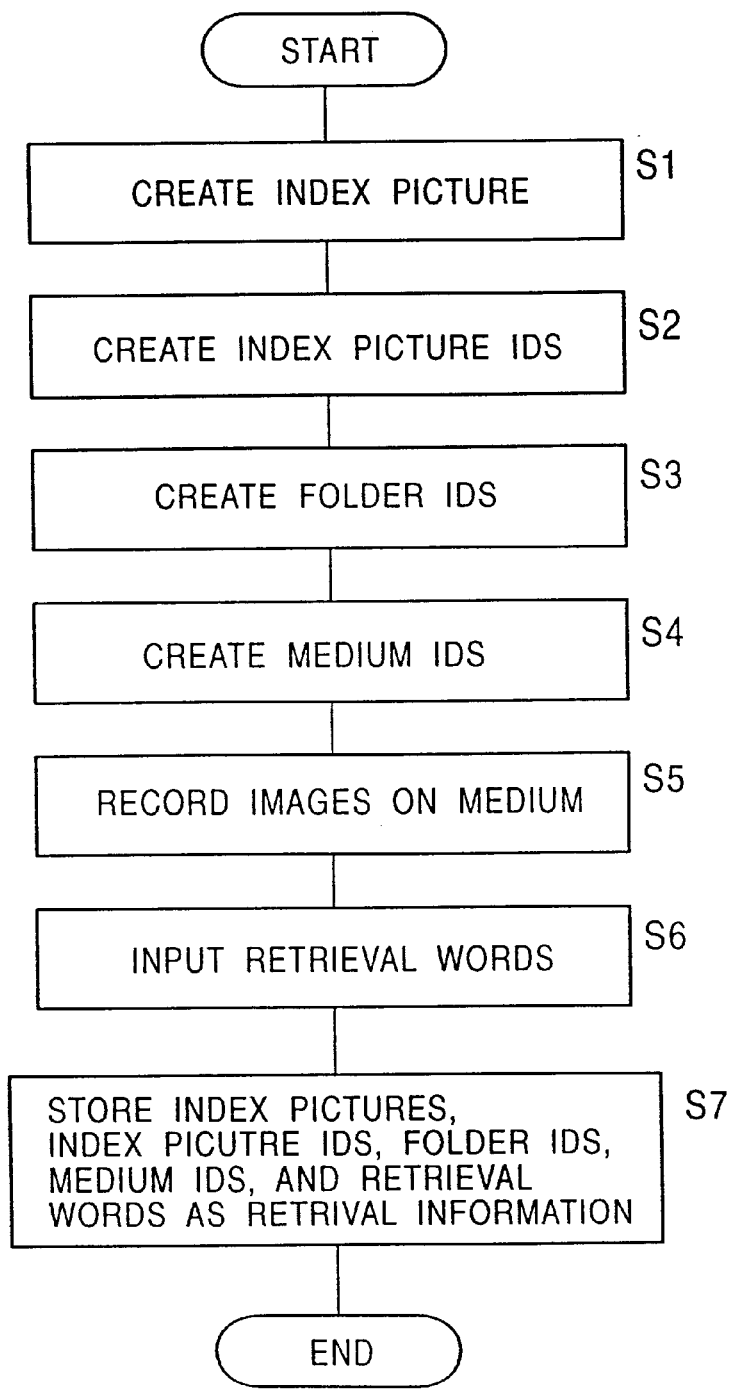
FIG. 2 is a flow chart illustrating the recording operation according to an embodiment of the present invention.

Referring back to FIG. 2, in step S2, index picture IDs are created, and more specifically, the recording controller 6 shown in FIG. 1 creates the IDs of the index pictures. That is, as illustrated in FIG. 4, an index picture ID 30 (XXX-XXX-001) corresponding to the index picture 31 is created, an index picture ID 32 (XXX-XXX-002) corresponding to the index picture 33 is generated, and an index picture ID 34 (XXX-XXX-003) corresponding to the index picture 35 is generated. The display controller 8 controls the monitor 4 to display the above index picture IDs 30, 32, and 34.

In step S3, folder IDs are created, and more specifically, the recording controller 6 shown in FIG. 1 generates folder IDs. That is, the image data is divided into predetermined groups, and the divided items of image data are stored by groups. The folder ID of each group is created, i.e., the folder IDs are generated in correspondence with the index pictures 31, 33, and 35, as shown in FIG. 4. The display controller 8 controls the monitor 4 to display the folder IDs. If the use of folder IDs is unnecessary, step S3 is omitted.

In step S4, medium IDs are created, and more particularly, the recording controller 6 shown in FIG. 1 generates medium IDs. That is, as illustrated in FIG. 4, a medium ID 26 (XXX-XXX-001) corresponding to the index picture 31 is generated, a medium ID 27 (XXX-XXX-002) corresponding to the index picture 33 is created, and a medium ID 28 (XXX-XXX-003) corresponding to the index picture 35 is generated. The display controller 8 controls the monitor 4 to display the medium IDs. It should be noted that the index picture IDs created in step S2, the folder IDs created in step S3, and the medium IDs generated in step S4 may be created simultaneously.

In step S5, images are recorded on media, and more specifically, the recording controller 6 shown in FIG. 1 records the images 21, 23, and 25 as image data on the media 20, 22, and 24, respectively, such as disks loaded in the disk drive 2 or hard disks built into the hard disk drive 3. Simultaneously, the index picture IDs, the folder IDs, and the medium IDs are recorded together with the image data. In this case, the image data is recorded by being distributed on a plurality of disks of the disk drive 2 or a plurality of hard disks of the hard disk drive 3. The reason for recording data by being distributed is to minimize the loss of data when the recording operation encounters a failure.

In step S6, retrieval words are input, and more specifically, the recording controller 6 recognizes that an operator has input, by using the key 1 shown in FIG. 1, retrieval words of the individual images 21, 23, and 25 or the individual index pictures 31, 33, and 35. The display controller 8 controls the monitor 4 to display the input retrieval words. If the use of retrieval words is unnecessary, step S6 is omitted.

In step S7, the index pictures, the index picture IDs, the folder IDs, the medium IDs, and the retrieval words are stored as retrieval information. More specifically, the recording controller 6 shown in FIG. 1 records on the retrieval-information storage unit 10 the index pictures, the index picture IDs, the folder IDs, the medium IDs, and the retrieval words as retrieval information. The display controller 8 controls the monitor 4 to display the retrieval information. The printer controller 9 may control the printer 5 to print on labels the retrieval information, in particular, the medium IDs, in which case, the labels may be attached to the respective media. The retrieval information may be wholly or partially printed on labels, which may be then attached to the corresponding media.

The retrieval operation is now described with reference to the flow chart of FIG. 3.

Figure 3:
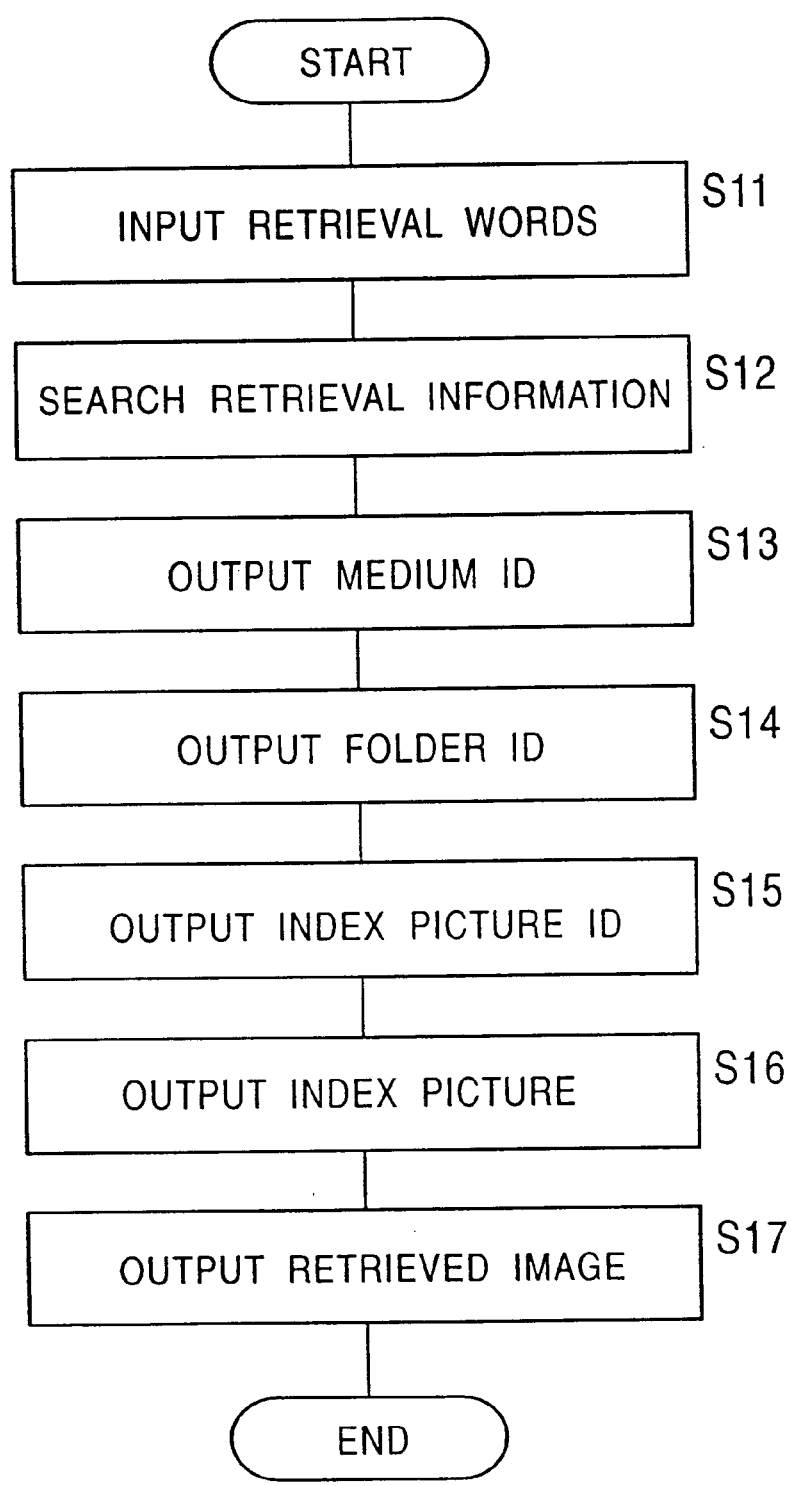
FIG. 3 is a flow chart illustrating the retrieval operation according to an embodiment of the present invention.

In FIG. 3, in step S11, retrieval words are input, and more specifically, the retrieval controller 7 recognizes that an operator has input, by using the key 1 shown in FIG. 1, the retrieval words of the individual images 21, 23, and 25 or the retrieval words of the individual index pictures 31, 33, and 35. The display controller 8 controls the monitor 4 to display the retrieval words. If the use of retrieval words is unnecessary, step S11 is omitted.

In step S12, retrieval information is searched, and more specifically, the retrieval controller 7 shown in FIG. 1 searches the index pictures, the index picture IDs, the folder IDs, the medium IDs, and the retrieval words, all of which are stored in the retrieval-information storage unit 10, in correspondence with the input retrieval words. If the retrieval words are not used, the operator conducts a search by referring to the individual index pictures 31, 33, and 35 by using the key 1 shown in FIG. 1. The display controller 8 controls the monitor 4 to display the index pictures 31, 33, and 35.

In step S13, the medium ID is output, and more specifically, the retrieval controller 7 shown in FIG. 1 retrieves the target medium ID from the medium ID 26 (XXX-XXX-001), the medium ID 27 (XXX-XXX-002), and the medium ID 28 (XXX-XXX-003) in accordance with the input retrieval words. The display controller 8 then controls the monitor 4 to display the medium ID. If the retrieval words are not used, the operator retrieves by using the key 1 the medium ID from the medium ID 26 (XXX-XXX-001), the medium ID 27 (XXX-XXX-002), and the medium ID 28 (XXX-XXX-003) corresponding to the index pictures 31, 33, and 35, respectively. The display controller 8 then controls the monitor 4 to display the retrieved medium ID.

In step S14, the folder ID is output, and more specifically, the retrieval controller 7 shown in FIG. 1 retrieves the folder ID corresponding to the retrieved medium ID, and the display controller 8 controls the monitor 4 to display the folder ID. If the use of folder IDs is unnecessary, step S14 is omitted.

In step S15, the index picture ID is output. More specifically, the retrieval controller 7 shown in FIG. 1 retrieves the target index picture ID from the medium ID 26 (XXX-XXX-001), the medium ID 27 (XXX-XXX-002), and the medium ID 28 (XXX-XXX-003) or from the index picture ID 30 (XXX-XXX-001), the index picture ID 32 (XXX-XXX-002), and the index picture ID 34 (XXX-XXX-003). The display controller 8 controls the monitor 4 to display the retrieved index picture ID.

In step S16, the index picture is output. More specifically, the retrieval controller 7 shown in FIG. 1 retrieves the target index picture from the index picture ID 30 (XXX-XXX-001), the index picture ID 32 (XXX-XXX-002), and the index picture ID 34 (XXX-XXX-003), and the display controller 8 controls the monitor 4 to display the index picture. If the retrieval words are not used, the medium ID and the folder ID may be output after the corresponding index picture has been output.

In step S17, the retrieved image is output. More specifically, the operator designates, by using the key 1, the retrieved images 21, 23, and 25 from the index pictures 31, 33, and 35, respectively. The retrieval controller 7 shown in FIG. 1 then identifies the designated images 21, 23, and 25, and the display controller 8 controls the monitor 4 to display the retrieved images 21, 23, and 25. The retrieval controller 7 controls the reduction/expansion controller 11 to expand the reduced size of the images of the index pictures into the original size or a desired size of the images, and controls the monitor 4 to display the expanded images on the monitor 4. In response to a printing instruction by pressing the key 1 by the operator, the printer controller 9 controls the printer 5 to print the retrieved images.

As described above, an image group consisting of individual images is stored in a medium (such as a floppy disk, a magneto-optical (MO) disk, a mini disc (MD)) or in a single folder of a storage unit, such as a hard disk. An index picture including the reduced images of the original images of the above image group is then created.

Subsequently, the medium IDs and the folder IDs unique to the respective media and folders are created, so that they can be related to the index pictures, respectively. The medium IDs, the folder IDs, and the index pictures are then stored as retrieval information in the retrieval-information storage unit 10, and are also recorded on the corresponding media.

With the above arrangement, a target image can be retrieved by visually checking the index pictures corresponding to the respective media. By checking the index pictures stored in the retrieval-information storage unit 10, a target image can be retrieved without the need for the exchange of media.

If the index pictures stored in the retrieval-information storage unit 10 is displayed on the monitor 4, and a target image is recognized from the index pictures, the medium ID corresponding to the index picture including the target image is displayed on the monitor 4. This makes it possible to select the medium, thereby retrieving the target image.

Even if images supplied from an external database are recorded by being distributed on a plurality of media, the index pictures stored in the retrieval-information storage unit 10 are displayed, and the medium ID corresponding to the index picture including a target image is displayed. It is thus possible to specify the medium from among a plurality of media and to retrieve the target image from the specified medium.

According to the foregoing description, the image retrieval apparatus of this embodiment includes the following elements. The recording controller 6, which serves as image-information recording means, records image information on a plurality of image-information recording media, such as disks of the disk drive 2 or hard disks of the hard disk drive 3. The reduction/expansion controller 11, which serves as reduced-image generating means, generates an index picture consisting of reduced images of a predetermined group of image information recorded on each image-information recording medium. The recording controller 6, which also serves as image-group ID-code generating means, generates index picture IDs as ID codes of reduced images, medium IDs as ID codes of image-information recording media, and folder IDs as ID codes of predetermined groups, while correlating the different types of IDs with each other. The retrieval-information storage unit 10, which serves as retrieval-information storage means, stores ID codes of the reduced images and ID codes of the image-information recording media and the predetermined group together with the reduced images. With this configuration, a desired item of image information is retrieved by using the ID codes of the reduced images and the ID codes of the image-information recording media and the predetermined groups. Accordingly, the reduced images can be correlated with the ID codes of the image-information recording media and the ID codes of the predetermined groups. It is thus possible to visually determine, by referring to the reduced images, in which image-information recording medium or in which predetermined group a target image is included. Then, the image-information recording medium can be specified to retrieve the target image. Additionally, since the ID code of the image-information recording medium and that of the predetermined group can be obtained, the ID code of the corresponding reduced images can be easily specified, thereby retrieving the reduced images. As a consequence, with a simple configuration, a target image can be retrieved by sequentially checking the reduced images visually.

According to the image retrieval apparatus of this embodiment, the ID codes of the reduced images and the ID codes of the image-information recording media and those of the predetermined groups are recorded on disks of the disk drive 2 or hard disks of the hard disk drive 3. Thus, the target reduced images can be obtained from the ID codes of the reduced images and from the ID codes of the recording media and those of the predetermined groups, all of the ID codes being recorded on the image-information recording media. Accordingly, a target image can be retrieved by visually checking the reduced images of the specified image-information recording medium or the predetermined group.

Additionally, the ID codes of the reduced images and the ID codes of the image-information recording media and those of the predetermined groups are printed on labels, and the labels are attached to the respective recording media. Consequently, without erroneously selecting the recording medium, the corresponding reduced images can be reliably obtained from the ID code of the reduced images, and the ID code of the image-information recording medium and that of the predetermined group, all of the ID codes being indicated on the recording medium. It is thus possible to retrieve a target image by visually checking the reduced images of the specified image-information recording medium and the predetermined group.

An image retrieval method of this embodiment has the following steps. In dividing image information and recording them on a plurality of image-information recording media, reduced images of a predetermined group of the image information recorded on each image-information recording medium are generated. ID codes of the reduced images and ID codes of the image-information recording media and those of the predetermined groups are generated while being correlated with each other. The ID codes of the reduced images and the ID codes of the image-information recording media and those of the predetermined groups are stored as retrieval information together with the reduced images. In retrieving the image information recorded on a plurality of image-information recording media, the ID code of the reduced images related to the image information to be retrieved, and the ID code of the corresponding image-information recording media and that of the predetermined group are output. The reduced images corresponding to the ID code of the reduced images and to the ID code of the image-information recording medium and that of the predetermined group are output. A desired image is then retrieved from the reduced images. With this arrangement, the reduced images can be correlated with the ID code of the image-information recording medium and that of the predetermined group. It is thus possible to visually determine, by referring to the reduced images, in which image-information recording medium or in which predetermined group a target image is included. Then, the image-information recording medium can be specified, and a target image can be retrieved merely by searching the specified recording medium. Additionally, the ID code of the image-information recording medium and that of the predetermined group can be obtained, and thus, the corresponding ID code of the reduced images can be acquired, thereby retrieving the corresponding reduced images. As a result, a target image can be retrieved by sequentially checking the reduced images visually, thereby decreasing the retrieval processing time.

According to the image retrieval method of this embodiment, retrieval words are stored, as part of retrieval information, for the respective reduced images and the respective image information recording media and predetermined groups. With this arrangement, the ID code of the reduced images and the ID code of the image-information recording medium and that of the predetermined group are output in correspondence with the input retrieval word. Accordingly, the image-information recording medium and the predetermined group can be easily specified, and also, the ID code of the corresponding reduced images can be obtained. It is thus possible to retrieve a target image by sequentially checking the corresponding reduced images visually.

Furthermore, desired image information can be selected when reduced images are stored. Accordingly, characteristic reduced images can be selected. By referring to the characteristic reduced images, the corresponding image-information recording medium and the predetermined group can be specified. This eliminates the unnecessary retrieval operation and enhances efficient retrieval of a target image in a short time.

In this embodiment, the image retrieval apparatus retrieves image data externally supplied from a digital camera or a digital video camera. However, the image retrieval apparatus may be incorporated into a digital camera or a digital video camera, or into a general personal computer.

What is claimed is:

1. An image management apparatus comprising:
    image data recording means for recording image data on an image data recording medium;
    index picture generating means for generating index pictures based upon a predetermined portion of said image data;
    retrieval information storage means for storing said index pictures; and
    index picture searching means for searching the retrieval information storage means for a desired index picture,
    whereby image data corresponding to the desired index picture is retrieved from the image data recording means based upon information obtained from the desired index picture.

2. An image management method comprising the steps of:

recording image data on an image data recording medium;

generating index pictures based upon a predetermined portion of said image data;

storing said index pictures in retrieval information storage means, and searching the retrieval information storage means for a desired index picture, whereby image data corresponding to the desired index picture is retrieved from the image data recording medium based upon information obtained from the desired index picture.

3. A storage medium for storing a program implementing an image management method, said image management method comprising the steps of:

recording image data on an image data recording medium;

generating index pictures based upon a predetermined portion of said image data; and storing said index pictures in retrieval information storage means, searching the retrieval information storage means for a desired index picture, whereby image data corresponding to the desired index picture is retrieved from the image data recording medium based upon information obtained from the desired index picture.

* * * * *